United States Patent
Oliker et al.

(10) Patent No.: US 11,003,748 B2
(45) Date of Patent: May 11, 2021

(54) UTILIZING BEHAVIORAL FEATURES TO IDENTIFY BOT

(71) Applicant: Unbotify Ltd., Ramat Yishai (IL)

(72) Inventors: Yaron Oliker, Yodfat (IL); Alon Dayan, Yodfat (IL); Yaacov Fernandess, Kfar Tavor (IL)

(73) Assignee: UNBOTIFY LTD., Ramat Yishai (IL)

( * ) Notice: Subject to any disclaimer, the term of this patent is extended or adjusted under 35 U.S.C. 154(b) by 251 days.

(21) Appl. No.: 15/365,989

(22) Filed: Dec. 1, 2016

(65) Prior Publication Data

US 2017/0185758 A1 Jun. 29, 2017

Related U.S. Application Data

(60) Provisional application No. 62/272,065, filed on Dec. 28, 2015, provisional application No. 62/272,058, filed on Dec. 28, 2015.

(51) Int. Cl.
*G06F 21/31* (2013.01)

(52) U.S. Cl.
CPC .... *G06F 21/316* (2013.01); *G06F 2221/2133* (2013.01); *G06F 2221/2151* (2013.01)

(58) Field of Classification Search
CPC ........... G06F 21/316; G06F 2221/2133; G06F 2221/2151
See application file for complete search history.

(56) References Cited

U.S. PATENT DOCUMENTS

| | | | |
|---|---|---|---|
| 8,442,863 B2* | 5/2013 | Chandramouli | G06Q 30/0241 705/14.43 |
| 8,997,226 B1* | 3/2015 | Call | G06F 21/552 726/22 |
| 9,438,539 B1* | 9/2016 | Daniel | H04L 69/22 |
| 9,544,271 B2* | 1/2017 | McFarland | H04L 65/1069 |
| 2008/0201206 A1* | 8/2008 | Pokorney | G06F 17/30867 705/7.29 |
| 2010/0262457 A1 | 10/2010 | House | |
| 2011/0131652 A1 | 6/2011 | Robinson et al. | |
| 2011/0173453 A1* | 7/2011 | Parsell | G06F 21/316 713/180 |
| 2012/0047256 A1* | 2/2012 | Hauser | G06F 21/36 709/224 |

(Continued)

OTHER PUBLICATIONS

Zi Chu, etal: Blog or Block: Detecting blog bots through behavioral biometrics.

*Primary Examiner* — Mohammad A Siddiqi

(57) ABSTRACT

A method, apparatus and product for identifying a bot agent using behavioral features. The method comprising obtaining a set of behavioral features of a usage of an input device during an interaction of an agent with a page, wherein the set of behavioral features are consistent with a human-generated interaction, wherein the set of behavioral features are generated based on events obtained from a client device used by the agent; automatically estimating whether the agent is a bot based on comparison of the set of behavioral features with one or more additional sets of behavioral features, wherein the one or more additional sets of behavioral features were previously obtained based on interactions of one or more agents with one or more pages; and in response to an estimation that the agent is a bot, performing a responsive action.

29 Claims, 5 Drawing Sheets

(56) References Cited

U.S. PATENT DOCUMENTS

| | | | |
|---|---|---|---|
| 2014/0278947 A1* | 9/2014 | Raab | G06Q 30/0248 |
| | | | 705/14.47 |
| 2015/0112892 A1* | 4/2015 | Kaminsky | G06N 7/00 |
| | | | 706/11 |
| 2015/0213251 A1 | 7/2015 | Turgeman | |
| 2016/0191554 A1* | 6/2016 | Kaminsky | H04L 63/1416 |
| 2016/0344769 A1* | 11/2016 | Li | H04L 63/168 |
| 2018/0183825 A1* | 6/2018 | Kurupati | H04L 63/1425 |

* cited by examiner

UTILIZING BEHAVIORAL FEATURES TO IDENTIFY BOT

CROSS REFERENCE TO RELATED APPLICATIONS

The present application claims the benefit of Provisional Patent Application U.S. 62/272,065 filed on Dec. 28, 2015, and of Provisional Patent Application U.S. 62/272,058 filed on Dec. 28, 2015, both of which are incorporated in reference in their entirety for all purposes, without giving rise to disavowment.

TECHNICAL FIELD

The present disclosure relates to bot detection in general, and to bot detection using behavior biometrics, in particular.

BACKGROUND

In the context of the present disclosure a "bot" is an automatic software agent that accesses web pages of websites. Bots can potentially harm websites in various ways, such as data scraping, advertisement fraud, credential stuffing, Denial of Service (DoS) attacks, and more. Bots have become a substantial problem in today's World Wide Web. For example, some studies indicate that billions of dollars are stolen every year by bot fraudsters.

One known method to distinguish bots from human interaction is Completely Automated Public Turing test to tell Computers and Humans Apart (CAPTCHA). A CAPTCHA is a challenge-response test used to determine whether or not the user is human. A CAPTCHA presents a challenge to the agent accessing a web page. Typically, the challenge may be a task that automated tools are less prone to respond correctly, such as identifying numbers or letters in a distorted image, which may be a relatively easy task for a human and relatively hard task for an automated agent.

BRIEF SUMMARY

One exemplary embodiment of the disclosed subject matter is a method comprising: obtaining a set of behavioral features of a usage of an input device during an interaction of an agent with a page, wherein the set of behavioral features are consistent with a human-generated interaction, wherein the set of behavioral features are generated based on events obtained from a client device used by the agent; automatically estimating whether the agent is a bot based on comparison of the set of behavioral features with one or more additional sets of behavioral features, wherein the one or more additional sets of behavioral features were previously obtained based on interactions of one or more agents with one or more pages; and in response to an estimation that the agent is a bot, performing a responsive action.

Optionally, the method may comprise verifying that the set of behavioral features are consistent with a human-generated interaction; and wherein in response to said verifying, performing said automatically estimating.

Optionally, said automatically estimating is performed by a classifier, wherein the classifier obtains multidimensional vectors each of which is defined by a set of behavioral features, wherein said classifier is configured to provide a classification of a bot for a set of behavioral features based on a statistical measurement being above or below a threshold.

Optionally, the set of behavioral features is based on a Page Interaction Packet (PIP), wherein the one or more additional sets of behavioral features are based on PIPs.

Optionally, the PIP and the PIPs are obtained from a same session.

Optionally, the PIP is obtained from a first session, wherein the PIPs comprise at least a subset of PIPs that are obtained from a second session.

Optionally, the PIP and the PIPs originate from pages, wherein the pages are pages of a same type.

Optionally, the type of the pages is selected from the group consisting of: a search results page; an item display page; a verification page; a login page; a form page; and a checkout page.

Optionally, the pages are pages of the same type from different websites, wherein the different websites are websites of a similar subject matter.

Optionally, the set of behavioral features is based on a Session Interaction Packet (SIP), wherein the one or more additional sets of behavioral features are based on SIPs.

Optionally, said automatically estimating comprises: obtaining a plurality of sets of behavioral features each of which is based on a Page Interaction Packet (PIP) of the agent, all of which were obtained during a same session, wherein the plurality of sets of behavioral features comprises the set of behavioral features; for each set of the plurality of sets of behavioral features, computing a statistical measurement with respect to the one or more additional sets of behavioral features; computing an aggregated statistical measurement based on the statistical measurement of each set of the plurality of set of behavioral features; and estimating whether the agent is a bot based on the aggregated statistical measurement being above or below a threshold.

Optionally, the set of behavioral features comprise at least one of: a speed of a movement of a pointing device; an acceleration of a movement of a pointing device; a curvature feature of a movement of a pointing device; one or more movement vectors of a pointing device; a pause pattern of a movement of a pointing device; a click pattern of one or more buttons of an input device; a time duration of the interaction; a flight time; a dwell time; an angle movement of a pointing device; acceleration measurement of a user device during the interaction; and an orientation of a user device during the interaction.

Optionally, said obtaining comprises receiving, by a server, the set of behavioral features or indications thereof from a client-side script embedded in the page that is being executed by a computerized device of the agent while the agent is interacting with the page.

Optionally, the one or more additional sets of behavioral features were previously obtained based on interactions with the page.

Another exemplary embodiment of the disclosed subject matter is an apparatus having a processor, the processor being adapted to perform the steps of: obtaining a set of behavioral features of a usage of an input device during an interaction of an agent with a page, wherein the set of behavioral features are consistent with a human-generated interaction, wherein the set of behavioral features are generated based on events obtained from a client device used by the agent; automatically estimating whether the agent is a bot based on comparison of the set of behavioral features with one or more additional sets of behavioral features, wherein the one or more additional sets of behavioral features were previously obtained based on interactions of one or more agents with one or more pages; and in response to an estimation that the agent is a bot, performing a responsive action.

Optionally, said processor is further adapted to perform: verifying that the set of behavioral features are consistent with a human-generated interaction; wherein in response to said verifying, performing said automatically estimating.

Optionally, said automatically estimating is performed by a classifier, wherein the classifier obtains multidimensional vectors each of which is defined by a set of behavioral features, wherein said classifier is configured to provide a classification of a bot for a set of behavioral features based on a statistical measurement being above or below a threshold.

Optionally, the set of behavioral features is based on a Page Interaction Packet (PIP), wherein the one or more additional sets of behavioral features are based on PIPs.

Optionally, the PIP and the PIPs are obtained from a same session.

Optionally, the PIP is obtained from a first session, wherein the PIPs comprise at least a subset of PIPs that are obtained from a second session.

Optionally, the PIP and the PIPs originate from pages, wherein the pages are pages of a same type.

Optionally, the pages are pages of the same type from different websites, wherein the different websites are websites of a similar subject matter.

Optionally, the set of behavioral features is based on a Session Interaction Packet (SIP), wherein the one or more additional sets of behavioral features are based on SIPs.

Optionally, the apparatus is a server connectable to computerized devices over a communication network, wherein said obtaining comprises receiving, by the server, the set of behavioral features or indications thereof from a client-side script embedded in the page that is being executed by a computerized device of the agent while the agent is interacting with the page.

Yet another exemplary embodiment of the disclosed subject matter is a computer program product comprising a non-transitory computer readable storage medium retaining program instructions, which program instructions when read by a processor, cause the processor to perform a method comprising: obtaining a set of behavioral features of a usage of an input device during an interaction of an agent with a page, wherein the set of behavioral features are consistent with a human-generated interaction, wherein the set of behavioral features are generated based on events obtained from a client device used by the agent; automatically estimating whether the agent is a bot based on comparison of the set of behavioral features with one or more additional sets of behavioral features, wherein the one or more additional sets of behavioral features were previously obtained based on interactions of one or more agents with one or more pages; and in response to an estimation that the agent is a bot, performing a responsive action.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
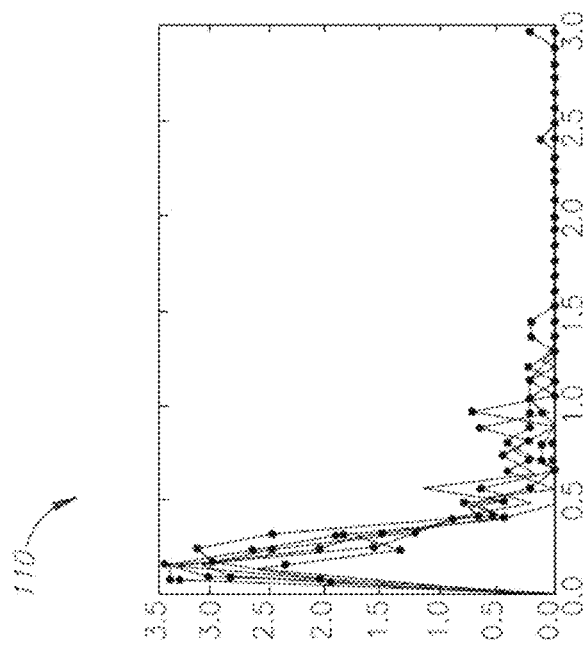
FIGS. 1A and 1B show illustrations of histograms representing empirical distribution of behavioral feature, in accordance with some exemplary embodiments of the disclosed subject matter.

One technical problem dealt with by the disclosed subject matter is to distinguish human agents from bot agents based on their interaction with one or more pages. In the present disclosure, the term "page" may refer to a web page within a website; a page within a web application; a page within an application which may or may not be implemented using native language for the operating system, such as native Android™ app, desktop app, and a similar app; or the like.

In some exemplary embodiments, a bot may perform a "replay attack" during which a recorded set of interactions originally performed by a human are injected by the bot, thereby mimicking a human behavior. In such a case, behavioral features alone may not be sufficient to distinguish between bot agents and human agents, as both agents generate interactions that can be characterized as human-generated. Such bots may record genuine human-generated interactions and re-use them ("replay") on additional pages, thereby providing interactions which may cause one to believe that the agent is a human agent and not a bot.

In some exemplary embodiments, a bot agent may use a Page Interaction Packet (PIP) generated based on a human agent's actions (i.e., "human-generated") and replay such interaction when accessing a page. In some exemplary embodiments, the PIP may comprise interaction data that an agent produces while interacting with a page. The PIP may include, for example, mouse movements, keyboard strokes, touch gestures, device orientation data, or the like. The PIP may be multiplied by the bot agent either as is without modification or while introducing stochastic noise to create variations on the PIP. The multiplied PIPs may then be used while interacting with a single website during a session, an operation which may be referred to as Intra-Session Replay Attack.

In some exemplary embodiments, a Session Interaction Packet (SIP) may comprise the set of PIPs generated during a single session.

In some exemplary embodiments, during an Intra-Session Replay Attack, a SIP may be compiled based on the multiplied PIPs, and used when the bot is accessing a website to simulate a human interaction during a session.

Some bot agents employ Inter-Session Replay Attacks. During an Inter-Session Replay Attack a bot may utilize a same human-generated PIP in different sessions. In some cases, several human PIPs may be gathered, multiplied (with or without variations) and used in different SIPs. The different SIPs may be sent to websites in different sessions in order to fake human behavior. In Inter-Session Replay Attack, a single session may comprise human-generated PIPs that are different from one another. A same human-generated PIP (or variations thereof) may not be used in the same session more than once. However, looking at different sessions, the same human-generated PIP (or variation thereof) may be used a large number of times by the bot.

Some bot agents automate interaction with the page until reaching a verification page used to differentiate human agents from bot agents, such as a page comprising CAPTCHA. Verification pages may be introduced dynamically, such as based on a suspicion by the server that the agent may be a bot agent, for example, based on a volume of queries generated by the agent during a timeframe, or may be set a-priori, such as in login pages, at entry points to websites or sections thereof, or the like. A bot agent may detect a verification page and pass the session to a human user to overcome the verification page itself. For example, a CAPTCHA presented to the bot agent may be transferred to a CAPTCHA farm service, in which a human may be presented with the CAPTCHA and the interactions produced by the human during interaction with the verification page and the CAPTCHA component embedded therein, also referred to as Verification Interaction Packet (VIP), may be gathered. The VIP may be sent by the bot agent to the verification page to overcome the CAPTCHA. After the CAPTCHA is solved, the bot agent may continue to traverse the website automatically, such as using other replayed human-generated interactions or using other forms of interactions.

It will be noted that the human-generated PIP may be modified to provide a desired result, such as pressing a specific link, interacting with a widget, or the like. However, such modification may not influence at all, or influence only in a negligible manner, behavioral features of the human-generated interactions.

One technical solution is to obtain behavioral features of the usage of an input device during an interaction of an agent with a page. The behavioral features may then be used in order to estimate whether or not the agent is a bot agent. In some cases, as the interaction is a human-generated interaction, the interaction by itself appears to be of human origin (i.e., behavioral features are consistent with a human user using the input device in such a manner). Estimation of whether the agent is a bot agent may be performed by comparing the behavioral features with a corpus of behavioral features. The corpus may be used to provide a baseline. A large deviation from the baseline may be indicative of the agent being a bot agent. The deviation may be that the interactions are too similar to one another (e.g., indicative of a same PIP being reused). The deviation may be that the interactions are too dissimilar from one another (e.g., indicative of PIPs generated by different human agents being compiled and used together by a same bot).

Figure 1B:
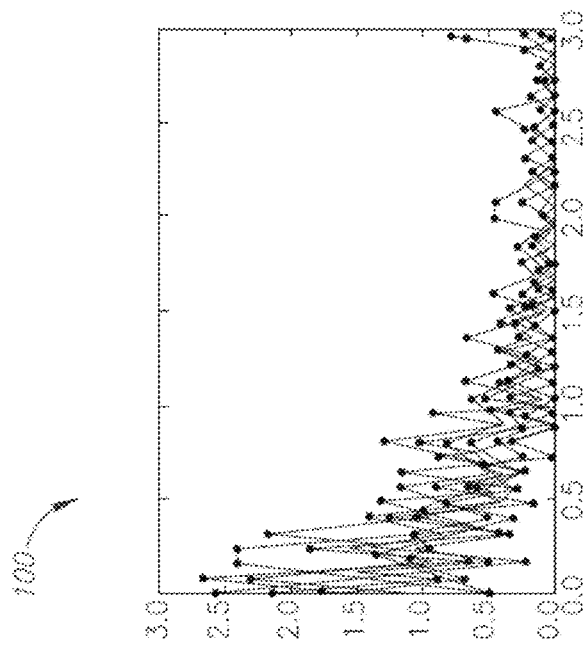

FIGS. 1A-1B show illustrations of histograms that describe the empirical distribution of a behavioral feature. Graph 100 of FIG. 1A exemplifies a histogram that describes the average speed of a group of human-agents on a certain website. Graph 110 of FIG. 1B exemplifies the same histogram on the same website, for a group of bot agents. As can be appreciated from such example, the behavioral features may be used to differentiate between human agents and bot agents. Additionally or alternatively, the histograms may represent any behavioral feature or statistical measurement of samples thereof, such as but not limited to average speed of the mouse movements of the agent, mouse pointer acceleration, the curvature of mouse movement, elapsed time, click patterns, pause pattern, movement vectors, average latency between the release of a keyboard key and the pressure of a next key (also referred to as "Flight Time"), average latency between the release of two successive keyboard keys, average latency between the pressure of two successive keys, duration of pressure on one key (also referred to as "Dwell Time").

In some exemplary embodiments, the set of values for each behavioral feature (referred to as generally a set of behavioral features, also denoted as BF) of the interaction being examined may be compared with a corpus of additional BFs. The additional BFs may be BFs that were observed from other interactions of the same agent during the same session. Using such BFs may be useful to identify Intra-Session Replay Attacks as the BF and additional BFs may be too similar (e.g., a similarity measurement being above an acceptable threshold). Additionally or alternatively, the additional BFs may be BFs that were observed from other interactions of agents during different sessions. Using such BFs may be useful to identify Inter-Session Replay Attack, as a PIP that is re-used by a bot in different sessions may be identified as creating a relatively dense cluster in a multidimensional space defined based on the BFs. Other metrics may be used instead of or in addition to density of clusters, in order to identify a PIP that was replayed.

Figure 2:
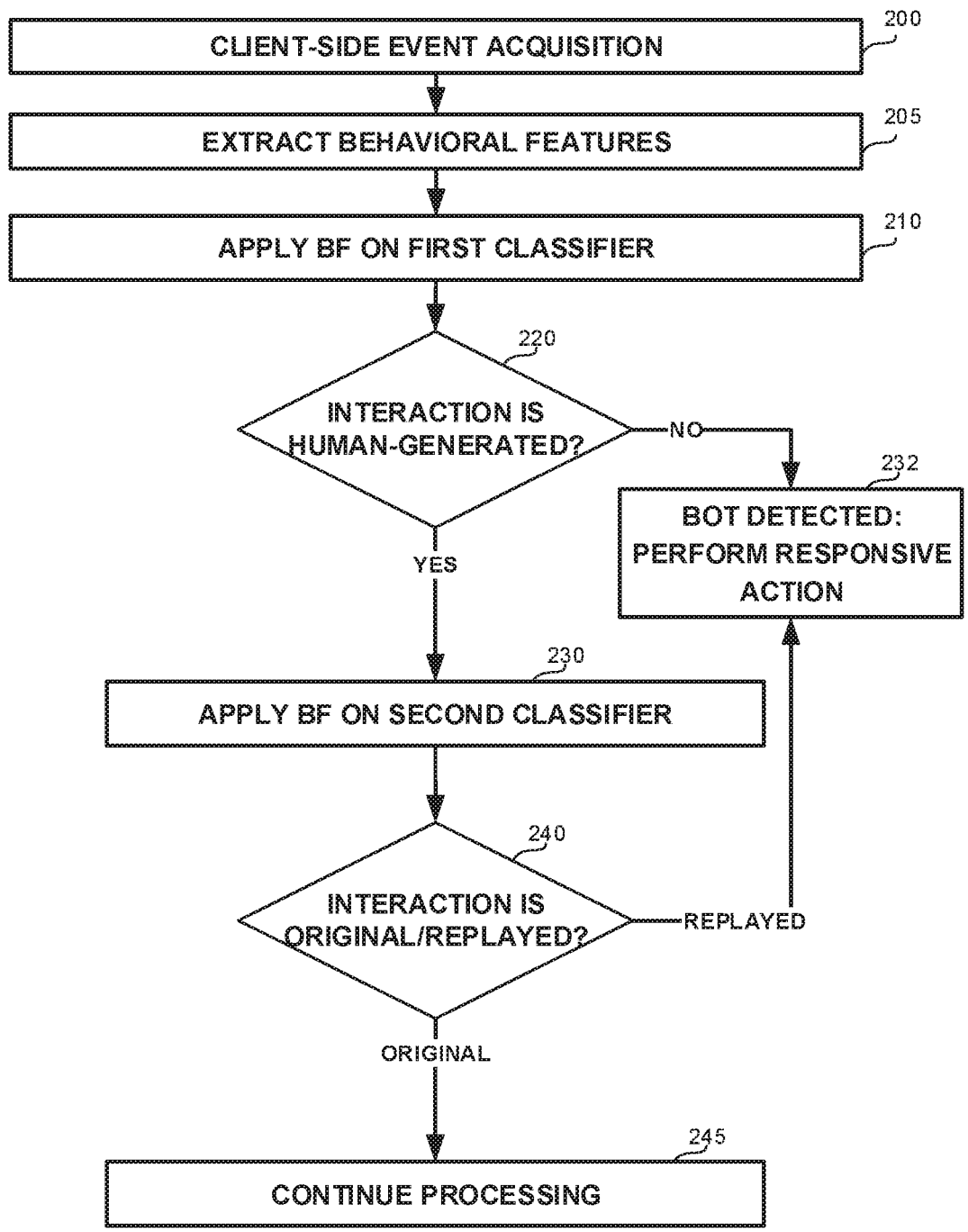
FIG. 2 shows flowchart diagrams of a method, in accordance with some exemplary embodiments of the disclosed subject matter.

Referring now to FIG. 2A showing a flowchart diagram of a method in accordance with some exemplary embodiments of the disclosed subject matter.

On Step 200, client-side event acquisition may be performed. In some exemplary embodiments, event acquisition may be performed by a client-side script that audits, logs or otherwise monitors user interactions that are generated by the agent of the client device. The client device may be, for example, a laptop, a Personal Computer, a mobile phone, a tablet computer, a Personal Digital Assistant (PDA), or any other computerized device capable of accessing pages over a communication network, such as the Internet. The client-side script may be a computer program executed by the client device. As an example, the client-side script may be embedded and provided as part of a page being viewed using a page viewer, such as an internet browser, an app interpreter, or the like, and be executed by the page viewer. In one embodiment, the client-side script may be a javascript code embedded within the web page being accessed. In another embodiment, the client-side script may be native code directly executable by the operating system of the device executing the page, such as objective-c for iOS™. In some exemplary embodiments, the interactions may include various communication channels of data potentially associated with Graphical User Interface (GUI) input devices or peripherals of the client device, such as mouse movements, keyboard strokes, touch gestures, device orientation data (e.g., obtainable from gyroscope and accelerometer sensors of the device), or the like. A stream of data may be monitored in each such channel and collected for analysis. Some or all of the analysis may be performed locally by the client-side script. Additionally or alternatively, the analysis may be performed, in whole or in part, by a remote server, by a cloud-based server, or the like. In some exemplary embodiments, server-side analysis may be more robust and less susceptive to manipulation by a malicious agent tampering with the client-side code. In some exemplary embodiments, the client-side event acquisition may generate a log of events exhibited by the agent. The log may be transmitted to a remote server for analysis. The log may comprise tracking data regarding peripherals and other input devices during the interaction of the agent with the page.

In some exemplary embodiments, complementary information, such as a copy of Hypertext Transfer Protocol (HTTP) traffic may be collected as well or HTTP metadata, either by the client-side script, or the web server responding to such HTTP traffic. The complementary information may include information useful for identifying geo-location of the agent, demographic information, connection method, session identification (e.g., session cookie), connectivity patterns, or the like. In some exemplary embodiments, HTTP session metadata may be collected.

In some exemplary embodiments, information may be collected at PIP level, indicating information for a single page interaction. Additionally or alternatively, information may be collected at SIP level, aggregating information over several pages for a single session.

On Step 205, behavioral features may be extracted from the interactions data, such as from a PIP. In some exemplary embodiments, measurements of one or more features may be extracted from the event acquired at Step 200. The valuations of each behavioral feature utilized by the disclosed subject matter may be referred to as a "set of behavioral features". In some exemplary embodiments, a data stream (also referred to a series) may be transformed into empirical distribution statistic using a discretization method such as entropy of the empirical distribution of the series, moment of the empirical distribution of the series, or the like. In some exemplary embodiments, each behavioral feature may be descriptive of how the user utilizes the input device to interact with the page. Without loss of generality, the behavioral features may comprise any of the following non-limiting examples: a speed of a movement of a pointing device, an acceleration of a movement of a pointing device, a curvature feature of a movement of a pointing device, movement vectors of a pointing device, a pause pattern of a movement of a pointing device, a click pattern of one or more buttons of an input device, a time duration of the interaction, an average angle of a movement of a pointing device during the interaction, a sharp turns count during the interaction (e.g., movements having an angle below a threshold), a variance of a movement angle of a pointing device, an orientation of a user device during the interaction, or the like.

It will be noted that in some cases, a set of behavioral features may be used as a biometric identifier of a user, which can be used to identify the same person at different interactions. Additionally or alternatively, a set of behavioral features may be used to differentiate human-generated interactions from interactions not generated by humans (e.g., bot-generated interactions). However, the set of behavioral features themselves may be ineffective to differentiate original human interactions (e.g., human-generated interactions generated by the human agent interacting with the page) from replayed human interactions (e.g., human-generated interactions recorded and reused by a bot agent interacting with the page).

On Step 210, a first classifier may be used. The set of behavioral features may be applied on the classifier to determine whether the behavioral features are consistent with being human-generated or non-human-generated. In some exemplary embodiments, the first classifier may be a predictive classifier configured to label a set of behavioral features as either "BOT" or "HUMAN". The first classifier may be trained using training data to be able to distinguish between human-generated interaction and non-human-generated interactions. The training may be based on a large number of instances of both human- and non-human-generated interactions, whose classification is known. The first classifier may be used to label the set of behavioral features as either "BOT" or "HUMAN".

It will be noted that the classification may be based on additional features, and may not be limited solely to behavioral features. For example, features relating to demographic information may be used and the prediction may be based on such features as well.

The label determination by the first classifier (220) may be used to determine whether the interaction is human-generated or not. It will be noted, however, that human-generated interaction does not guarantee, original interaction that is not being replayed. In case, the interaction is determined to be non-human-generated, Step 232 may be performed. Otherwise, Step 230 may be performed.

On Step 230, a second classifier may be utilized. The set of behavioral features may be provided to the second classifier to determine whether the interaction is original or replayed. The behavioral features used in Step 230 may be the same or different than those used in Step 210. Additionally or alternatively, the second classifier may utilize additional features that are not behavioral features, such as features extracted from the HTTP metadata.

In some exemplary embodiments, the second classifier may be a classifier implementing non-supervised learning techniques or semi-supervised learning techniques. In some exemplary embodiments, each set of features used by the second classifier to represent an interaction by an agent, may be viewed as an n-dimensional vector in an n-dimensional space. The second classifier may inspect statistical measurement relating to the vector representing the interaction being examined. In some exemplary embodiments, in case the vector is in a relatively dense area of the n-dimensional space, such as an area for which calculated density is above a predetermined threshold, above a designated percentile density in the space, or the like, it may be determined that the interaction is suspected as being replayed. In some exemplary embodiments, other statistical measurement may be employed in addition to or instead of density. In some exemplary embodiments, the second classifier may identify clusters in a multidimensional space and provide its estimation based thereof. Density and other statistical measurement may be computed with respect to the cluster of which the vector is a member.

In some exemplary embodiments, the classifier may compare the vector of the interaction with a subset of all vectors available thereto. In some exemplary embodiments, vectors of other recorded interactions may be available to the classifier and retained in a data storage. A subset of the interactions may be employed for the determination.

For example, in case the vector under examination (VUE) is a PIP-based vector, the space may consist of only other PIP-based vector (e.g., excluding SIP-based vectors from the space). In some exemplary embodiments, in case of a relative dense area of the VUE is high (e.g., density above threshold, which is relative and based on general density in the space), it may be determined that the interaction is replayed and was viewed in many previous interactions (e.g., in the same session or in different sessions). The PIP may be deemed as a human-generated interaction which is replayed in the same session or in different sessions.

As another example, the PIP-based VUE may be compared with other PIP-based vectors obtained from interactions in the same session. In case of high density, the interaction may be deemed as being reused in the same session. Additionally or alternatively, in case of a low density, the interaction may be deemed as inconsistent with the person performing other interactions in the same session, and is therefore indicative of a combination of different PIPs from different sessions and users that are being reused in the same session.

As yet another example, the PIP-based VUE may be compared with other PIP-based vectors obtained based on interactions of users with the same type of page as the interaction of the VUE. In some exemplary embodiments, interaction with a page may be substantially different depending on the type thereof. Interactions with pages of a same type, albeit being in different sites, may be relatively similar. Consider for example, users' interaction with GOOGLE™ search results page, which may be substantially similar to the users' interaction with BING™ search results page. The type of page may be, for example, a search results page, an item display page, a verification page, a login page, a form page, a checkout page, or the like. The item display page may be a page displaying information about an item, such as without limitation, a movie page in IMDB™, a book page in AMAZON™, a product page in ALIEXPRESS™, or the like. The verification page may be a page comprising a mechanism to differentiate between humans and bots, such as CAPTCHA. A login page may be a page comprising input fields to be used to provide credentials. In some exemplary embodiments, the login page may be categorized into sub-types based on the credentials type. As an example, a page requiring only site-specific credentials may be of different type than a page allowing Single Sign On (SSO) credentials. Additionally or alternatively, different SSOs may be associated with different sub-types (e.g., type for GOOGLE™ SSO and a different type for FACEBOOK™ SSO). A checkout page may be a page where the user performs a checkout activity, such as completing transaction created through the session. In some exemplary embodiments, the form page may be a page comprising a fillable form. The fillable form may be comprised of input widgets such as radio button widgets, text input widgets, select widgets, or the like. In some exemplary embodiments, form pages having a same or similar (e.g., about ±30%; about ±3; or the like) number of widgets may be considered as pages of the same type. Additionally or alternatively, only form pages having a same or similar number of widgets of each type may be considered as pages of the same type.

As yet another example, the VUE may be compared with vectors that are based with other PIPs or SIPs in which the same page was visited. Such comparison may allow for differentiating abnormal behavior that are abnormal to the specific page. Such embodiments may enable treating the same VUE differently depending on the specific page in which the interaction occurred. The same may be applicable to sessions in the same site. The disclosed subject matter may provide for a framework for checking interactions in different pages, in different sites, and not limited to a specific page or site, while still providing accuracy that is based on big data analytics of interactions that were viewed with each specific page or site.

As yet another example, the VUE may be an SIP-based vector. The VUE may be compared with a space consisting of only other SIP-based vectors (e.g., excluding PIP-based vectors from the space). In such a case, high density may be indicative of a same SIP (or variations thereof) being reused by a bot in different sessions.

In some exemplary embodiments, the classifier may obtain the vectors based on all the PIPs that were obtained in the same session as the interactions upon which the VUE is based. For each same session vector, a statistical measurement (e.g., density measurement) may be computed with respect to one or more additional vectors (e.g., based on PIPs from different sessions). An aggregated statistical measurement, such as average density, variance of density, skewness of density and kurtosis of density, or the like, may be computed, and used to determine whether the session comprises replayed interactions, such as created using Inter- or Intra-Session Replay Attack.

In some exemplary embodiments, when using PIPs of the same session, all PIPs of the same session may be used. Additionally or alternatively, all PIPs except for VIPs may be used. In some exemplary embodiments, as the verification process of the VIP has passed, the VIP itself may be original VIP generated by a CAPTCHA farm, rather than a replayed interaction. As a result, such original interaction should be overlooked when examining the entire session for determining whether the agent operating is a human or a bot.

In some exemplary embodiments, any combination of the above mentioned examinations may be employed by the second classifier to estimate whether the interaction of the VUE is original or replayed.

On Step 240, based on the prediction provided by the second classifier, it may be determined whether the human-generated interaction is original or replayed. In case the interaction is original, normal processing may be performed (Step 245) without interference. In case the interaction is estimated to be replayed, responsive action may be performed (Step 232).

On Step 232, in response to a bot-detection, a responsive action is performed. The responsive action may be designed to mitigate the risk from the bot operation. In some exemplary embodiments, the session may be discontinued to prevent the bot from acting. Additionally or alternatively, the web server of the web page may blacklist the IP address of the agent to prevent the same IP to be reused by the bot. In some exemplary embodiments, instead of blacklisting, IP information may be used as part of the estimation process. Additionally or alternatively, in order to prevent DoS attacks, bot agents may be redirected to designated bot servers for handling additional requests therefrom. Additionally or alternatively, different pages may be provided to bot agents, such as pages specifically designed for bots to provide the bots with false information about the site, thereby preventing impermissible data mining from the site, vulnerability detection in the site, or the like. Additionally or alternatively, a verification page may be provided to the bot to verify the estimated decision. It will be noted, however, that verification pages may be circumvented, such as using the services of CAPTCHA farms. Additionally or alternatively, actions taken by the bot agent may be disregarded, such as discounting credit accumulated to the agent, overlooking advertisement impressions served to the bot and Pay Per Click (PPC) advertisements presented to the bot in response to the bot performing an action (e.g., clicking on a banner), or the like. In some exemplary embodiments, the responsive action may be designed to allow for analysis of bot and non-bot sessions. In some exemplary embodiments, the responsive action may tag sessions with a bot or non-bot label, allowing for offline analysis of the session information. In some exemplary embodiments, session data may be utilized for website optimization, such as for a-b testing of different versions of the website. The optimization may be improved by relating solely to non-bot sessions, which may be achieved using the tagging.

In some exemplary embodiments, a single classifier may be utilized to unify Steps 210 and 230. In some exemplary embodiments, the classifier may be configured to label each VUE as "HUMAN", "BOT" or "REPLAYED", indicating human agent, bot-generated interaction, or human-generated bot-replayed interaction. In some exemplary embodiments, the label of REPLAYED may be unified with the BOT label. In some exemplary embodiments, the first classifier may not be employed and instead only the second classifier may be used without first verifying that the interaction is consistent with human-generated interaction.

Figure 3A:
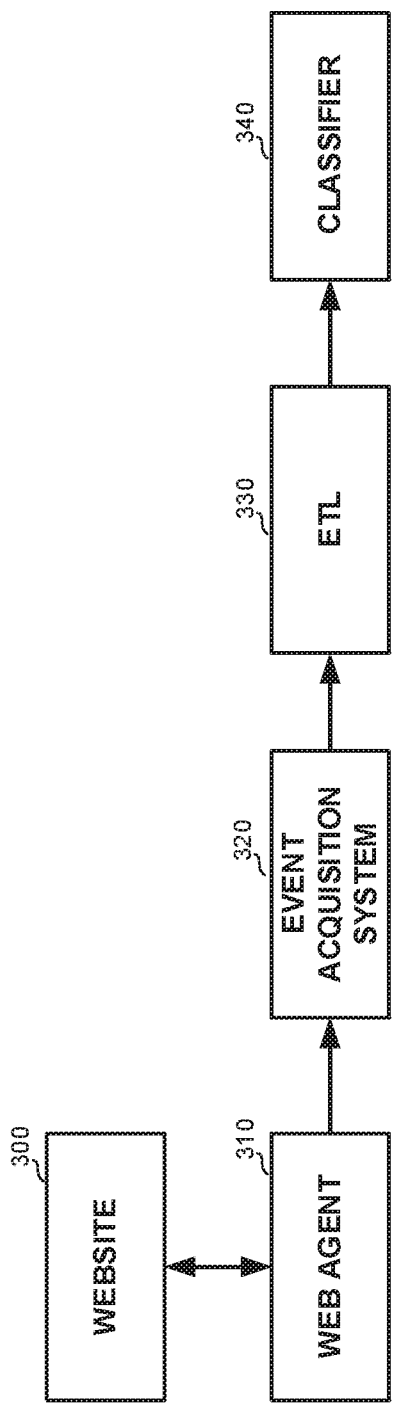
FIGS. 3A-3B show flowchart diagrams of methods, in accordance with some exemplary embodiments of the disclosed subject matter.

Referring now to FIG. 3A showing a flowchart diagram of a method in accordance with some exemplary embodiments of the disclosed subject matter.

Web Agent 310 may be an agent interacting with a Website 300 over a session. Web Agent 310 provides activity reports to Event Acquisition System (EAS) 320. EAS 320 may be configured to obtain peripherals tracking data, such as of mouse, keyboard, touchpad, touch screen, orientation, or the like, originated from the device employed by Web Agent 310. EAS 320 may further obtain HTTP session metadata of Web Agent 310 interacting with Website 300. In some exemplary embodiments, EAS 320 is deployed on a server, and obtains by receiving reports issued by a client-side script embedded in the page of Website 300 that is being executed by the device of Web Agent 310 while Web Agent 310 is interacting with Website 300.

Extract, Transform & Load (ETL) 330 may be a module configured to transform each event acquired by EAS 320 into a set of features to be used by Classifier 340. The features may comprise at least in part, behavioral features based on the peripherals tracking data. The set of features generated by ETL 330 may be a multidimensional vector in a multidimensional space.

The vector of features generated by ETL 330 may be provided to Classifier 340 for training. In some exemplary embodiments, training may be performed with respect to human-verified Web Agent 310 or to bot-verified Web Agent 310.

Additionally or alternatively, the vector of features generated by ETL 330 may be added to a repository used by Classifier 340 for its estimation. In some exemplary embodiments, after large amounts of vectors are generated by ETL 330 based on many monitored interactions, the predicative capabilities of Classifier 340 may be improved.

Figure 3B:
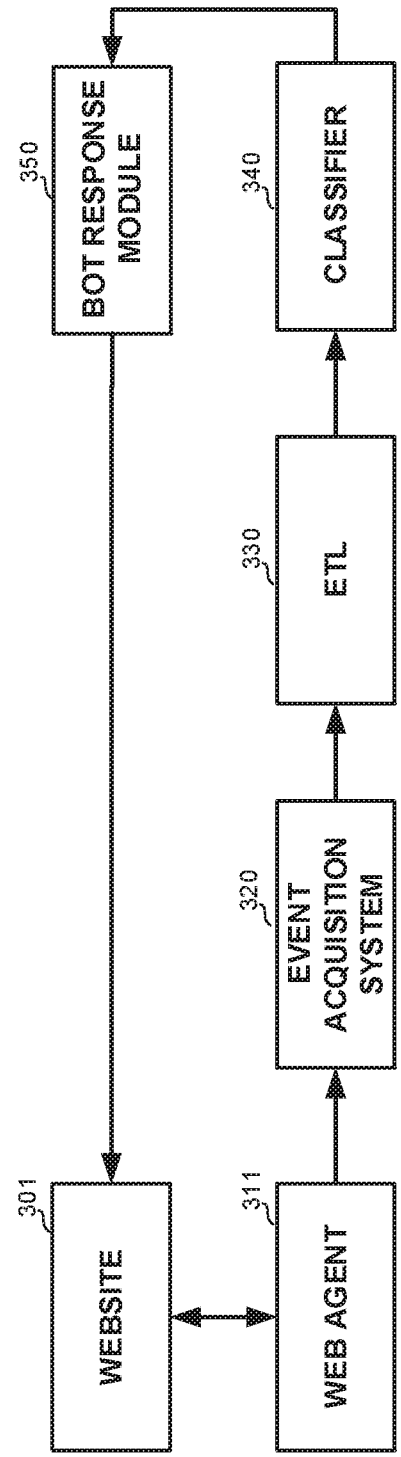

Referring now to FIG. 3B showing a flowchart diagram of a method in accordance with some exemplary embodiments of the disclosed subject matter. In FIG. 3B, Classifier 340 is being used to provide a prediction.

Web Agent 311 is interacting with Website 301, which may or may not be the same website as Website 300. EAS 320 may acquire events which are transformed by ETL 330 to features. The features may be fed to Classifier 340 to provide a prediction. In some exemplary embodiments, the features are also added to Classifier's 340 repository to be used for future predictions as well. In case Classifier 340 estimates that Web Agent 311 is a bot, Bot Responsive Module 350 may be employed to implement a responsive action. The responsive action may be determined based on rules, based on the identity of the Website 301 or web page therein being accessed, or the like. In some exemplary embodiments, Bot Responsive Module 350 may instruct Website 301 to alter its functionality in view of the bot detection, such as issue a redirect notification, provide different web pages to Web Agent 311, or the like.

Figure 4:
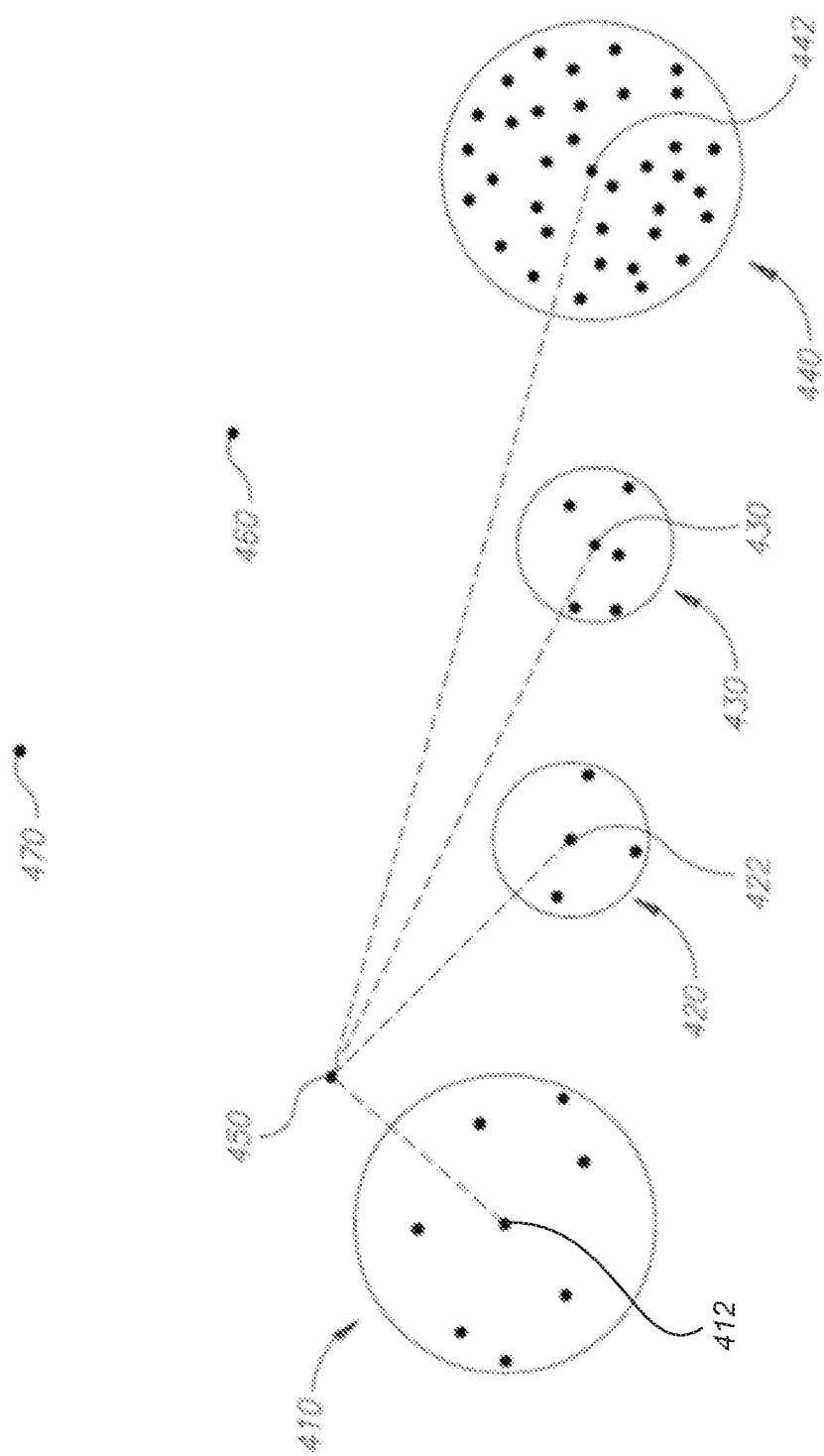
FIG. 4 shows an illustration of clusters and usage thereof, in accordance with some exemplary embodiments of the disclosed subject matter.

FIG. 4 shows an illustration of clusters that are automatically determined based on the set of behavioral features. Based on clustering process, Clusters 410, 420, 430, 440 may be identified.

A cluster may represent a typical type of behavior. For example, Cluster 410 may comprise interactions with very slow mouse movements, while interactions with very fast mouse movements may be grouped in Cluster 440.

In some exemplary embodiments, centroids of each cluster may be computed and potentially stored to be retrieved when needed. In some exemplary embodiments, other statistical features of the clusters may be computed, such as, for example, a density of the clusters, a scattering and the number of elements in each cluster, an average distance of the elements in each cluster from their centroid, a standard deviation of the distances, or the like. Such statistical features may be stored in a database for further usage.

Centroids of each cluster may be computed, such as Centroids 412, 422, 432, 442. Additionally or alternatively, density of Cluster 430 may be greater than that of Cluster 420. In some exemplary embodiments, dense clusters with small diameter may be indicative of bot agents replaying the same interaction over and over in different sessions. Though Cluster 440 may be denser than Cluster 430, it has a relatively larger diameter, indicating that the cluster has a large degree of variations, and therefore is not necessarily a bot cluster. In some exemplary embodiments, Cluster 410 may have relatively small number of instances scattered therein, indicating that the cluster is likely to comprise rare interactions that have relatively low correlation with one another and therefore may be indicative of non-standard human behavior, and potentially various interactions by bots.

In some exemplary embodiments, clusters may be labeled. In some exemplary embodiments, clusters may be labeled as "HUMAN" or "BOT". Labeling may be performed manually, automatically or in a semi-automatic manner. In some exemplary embodiments, automatic labeling may be based on sessions in which bots were detected as indicting bot interactions which may infer a bot cluster. Additionally or alternatively, sessions in which a human agent was validated without a doubt may be used to infer a human cluster. As an example, a session in which a purchase order was completed and including making payment may be treated as a validated human agent session. In some exemplary embodiments, the session may be no longer assumed to be a human agent session if the purchase order was canceled and/or the payment was canceled subsequently to the purchase order being completed. In some exemplary embodiments, the training data for such semi-supervised method may not include information from validation mechanisms, such as CAPTCHA, as such mechanisms may be circumvented. Instead, the training data may include data that is validated in other manners, such as by performing actions which bot agents do not perform, by relying on human interaction with the human agent to verify her identity, or the like.

In some exemplary embodiments, automatic labeling may be based on clusters' statistical features such as diameter, density, standard deviation, or the like. Such features may be compared with predetermined or computed thresholds, which may be absolute or relative.

Referring again to FIG. 4, Vectors 450, 460 and 470 may be analyzed. Vector 450 is relatively close to Cluster 410. Therefore, it may be deduced that the chances of Vector 450 being produced by a bot agent are not high, even though it does not match any existing cluster. The probability of Vector 460 being of a bot agent is higher, though it may be estimated to have some relation with Cluster 430. Vector 470 is very distant from all obtained clusters, and can therefore be estimated that it is associated with a bot agent.

In some embodiments, the distances may be weighted according to various factors, such as a number of elements (either normalized or not) in the clusters, cluster density, or the like. These weights may help in reflecting the clusters more accurately, as they reflect not only the typical human-behaviors, but also how typical they are. Moreover, the examined distance of the VUE from the centroids could be for example, but not limited to—the minimum distance, the average distance, the weighted average distance, or any other distance-heuristic.

Moreover, each interaction may be examined from several data-perspectives, in accordance to the number of the behavioral features that are examined. The chances that an interaction is generated by a bot agent is higher when many of its vectors are too far from the obtained centroids. A user that moves his mouse in a specific SIP in an irregular speed, for example, is not necessarily a bot. However, if its acceleration and movement curvature (and/or other features) are also irregular—the chances that it is a bot may be higher. Therefore, a large collection of behavioral features may reduce the chances of false positive determinations (i.e. erroneously flagging an interaction generated by a human agent as a bot agent). Similarly, if the irregularity is local to a single VUE, for example, in one PIP, such irregularity may be insufficient to estimate, with a high confidence level, that the user is a bot. However, if there are irregularities that are exhibited in different perspectives, such as when examining one PIP, sets of PIPs in the session, the SIP, or the like, the confidence level of the bot detection may be considered higher and therefore an estimation may be produced.

In some exemplary embodiments, the estimation may be produced only in case that the confidence level is above a threshold. In some exemplary embodiments, if there is a bot estimation with a confidence level that is below a threshold, a responsive action may be implemented to gather additional information to re-perform the determination. The additional information may include causing the user to pass through a verification page, gathering additional PIP data to perform additional checks or the like. In some exemplary embodiments, during the phase in which additional information is gathered, the agent may be estimated as a bot, and may be prohibited from performing some actions (e.g., accessing specific data elements). Additionally or alternatively, bot estimated agent may be allowed to click on ads. However, in order to prevent click frauds, ad serving may be disabled or the economic effect of the ad serving may be disabled. In some exemplary embodiments, if the estimation is later on refuted, the economic effect may be retroactively enabled.

Figure 5:
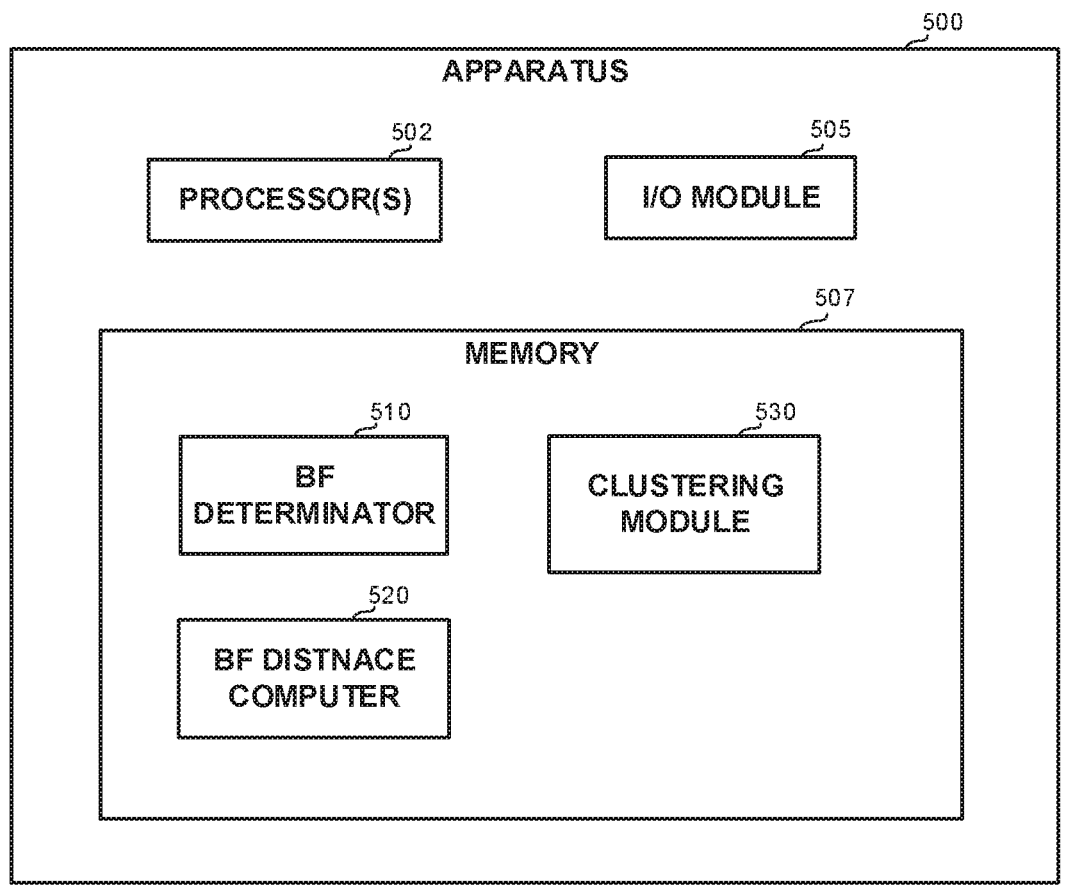
FIG. 5 shows a block diagram of an apparatus, in accordance with some exemplary embodiments of the disclosed subject matter.

Referring now to FIG. 5 showing an apparatus in accordance with some exemplary embodiments of the disclosed subject matter. An apparatus 500 may be configured to perform any of the methods of FIGS. 2, 3A-3B, or the like.

In some exemplary embodiments, Apparatus 500 may comprise a Processor 502. Processor 502 may be a Central Processing Unit (CPU), a microprocessor, an electronic circuit, an Integrated Circuit (IC) or the like. Processor 502 may be utilized to perform computations required by Apparatus 500 or any of it subcomponents.

In some exemplary embodiments of the disclosed subject matter, Apparatus 500 may comprise an Input/Output (I/O) Module 505. The I/O Module 505 may be utilized to provide an output to and receive input from a user. In some exemplary embodiments, user input may be provided in manual validation of cluster labels, in manual labeling of clusters, or the like. It will be understood, that Apparatus 500 may be configured to operate without user input or human interaction.

In some exemplary embodiments, Apparatus 500 may comprise Memory 507. Memory 507 may be a hard disk drive, a Flash disk, a Random Access Memory (RAM), a memory chip, or the like. In some exemplary embodiments, Memory 507 may retain program code operative to cause Processor 502 to perform acts associated with any of the subcomponents of Apparatus 500. In some exemplary embodiments, Memory 507 may retain clustering data, such as clusters, centroids or other statistical features thereof, labeling of clusters, or the like.

BF Determinator 510 may be configured to obtain and compute the set of behavioral features based on an interaction packet, such as PIP, SIP, CIP, or the like. In some exemplary embodiments, BF Determinator 510 may be configured to compute various BFs for a same interaction packet, each of which associated with a different group of behavioral features.

BF Distance Computer 520 may be configured to compute a distance measurement between two vectors representing BFs. In some exemplary embodiments, the distance measurement may be based on any distance metric. In some exemplary embodiments, the distance measurement may take into account information regarding a cluster of one of the BFs, such as in case an BF is compared with a centroid BF of a cluster.

Clustering Module 530 may be configured to compute clusters based on BF data. Clustering performed by Clustering Module 530 may utilize non-supervised machine learning techniques, semi-supervised machine learning techniques, or the like. In some exemplary embodiments, Clustering Module 530 may provide labeling for clusters, such as based on automated deduction, semi-automatic determination having manual validation, manual input by human users, or the like.

An Embodiment

One embodiment of the disclosed subject matter is a method for classifying an HTTP session in a manner that distinguishes between a human agent and a bot agent.

(1) Client-side events are acquired. The client-side events are events generated by the client's device GUI peripherals, such as, pointing devices, keyboard devices and move sensors, on a given page in an HTTP session.

(2) The raw GUI events of a given page are transformed to a multi-dimensional numerical vector representing behavioral features and HTTP metadata features.

(3) A machine learning classifier is provided with the vector. The classifier distinguishes between pages that originated from a human agent and between a bot agent. If the classifier determines the agent to be a bot agent, such indication is returned. Otherwise, the process continues.

(4) The multi-dimensional numerical vector is embedded in a multi-dimensional space. The vector's similarity/distance/density is compared to that of a control group of previously generated multi-dimensional numerical vectors. The control group can be generated using events from pages as follows: (a) previous pages from the same session; (b) previous pages accessed by different sessions on the same page; (c) previous pages accessed by different sessions that are similar to the current page.

(5) A rule engine may be employed. The rule agent may implement any or all of the following non-limiting, exemplary, rules. If the current page generates a highly dense or very sparse density with reference to control group (a), it may be concluded that the page originated by a bot agent. If the current page generates a highly dense or very sparse density with reference to control group (b), it may be concluded that the page originated by a bot agent via multiple sessions. If the current page generates a highly dense or very sparse density with reference to control group (c), it may be concluded that the page originated by a bot agent. Additional control groups and rules may be used in the determination. In case no rule indicated that the current page was visited by a bot agent, an indication that the agent is a human agent may be returned.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining a set of behavioral features based on a Page Interaction Packet (PIP) of a usage of an input device during an interaction of an agent with a web page, wherein the set of behavioral features are consistent with a human-generated interaction, wherein the set of behavioral features including mouse movements are generated based on events obtained from a client device used by the agent;
   automatically estimating whether the agent is a bot based on:
      comparison of the set of behavioral features with one or more additional sets of behavioral features based on PIPs, wherein the one or more additional sets of behavioral features, including mouse movements, were previously obtained based on interactions of one or more agents with one or more web pages, wherein the PIPs originate only from web pages of a same type as the PIP; and
      subject to the behavioral features representing a human-generated interaction, determining that the set of behavioral features is associated with replayed human interactions rather than original human interactions, wherein replayed human interactions are interactions in which a recorded set of interactions originally performed by a human are injected by the bot, thereby mimicking human behavior; and
   in response to an estimation that the agent is a bot, performing a responsive action.

2. The method of claim 1 further comprising:
   verifying that the set of behavioral features are consistent with a human-generated interaction;
   wherein in response to said verifying, performing said automatically estimating.

3. The method of claim 1, wherein said comparison is performed by a first classifier, wherein the first classifier obtains multidimensional vectors each of which is defined by a set of behavioral features, wherein said first classifier is configured to provide a classification of a bot for a set of behavioral features based on a statistical measurement being above or below a threshold.

4. The method of claim 1, wherein the PIP and the PIPs are obtained from a same session.

5. The method of claim 1, wherein the PIP is obtained from a first session, wherein the PIPs comprise at least a subset of PIPs that are obtained from a second session.

6. The method of claim 1, wherein the type of the web pages is selected from the group consisting of:
   a search results page;
   an item display page;
   a verification page;
   a login page;
   a form page; and
   a checkout page.

7. The method of claim 1, wherein the web pages are web pages of the same type from different websites, wherein the different websites are websites of a similar subject matter.

8. The method of claim 1, wherein the set of behavioral features is based on a Session Interaction Packet (SIP), wherein the one or more additional sets of behavioral features are based on SIPs.

9. The method of claim 1, wherein said automatically estimating comprises:
   obtaining a plurality of sets of behavioral features each of which is based on a Page Interaction Packet (PIP) of the agent, all of which were obtained during a same session, wherein the plurality of sets of behavioral features comprises the set of behavioral features;
   for each set of the plurality of sets of behavioral features, computing a statistical measurement with respect to the one or more additional sets of behavioral features;
   computing an aggregated statistical measurement based on the statistical measurement of each set of the plurality of set of behavioral features; and
   estimating whether the agent is a bot based on the aggregated statistical measurement being above or below a threshold.

10. The method of claim 1, wherein the set of behavioral features comprise at least one of:
    a speed of a movement of a pointing device;
    an acceleration of a movement of a pointing device;
    a curvature feature of a movement of a pointing device;
    one or more movement vectors of a pointing device;
    a pause pattern of a movement of a pointing device;
    a click pattern of one or more buttons of an input device;
    a time duration of the interaction;
    a flight time;
    a dwell time;
    an angle movement of a pointing device;
    acceleration measurement of a user device during the interaction; and
    an orientation of a user device during the interaction.

11. The method of claim 1, wherein said obtaining comprises receiving, by a server, the set of behavioral features or indications thereof from a client-side script embedded in the web page that is being executed by a computerized device of the agent while the agent is interacting with the web page.

12. The method of claim 1, wherein the one or more additional sets of behavioral features were previously obtained based on interactions with the web page.

13. The method of claim 1, wherein determining whether the behavioral features are generated by original human interactions or replayed human interactions is performed by a second classifier.

14. The method of claim 1, wherein the PIP and PIPs exclude Verification Interaction Packets (VIPs).

15. The method of claim 1, wherein said determining that the set of behavioral features is associated with replayed human interactions rather than original human interactions, is based on a similarity degree between the set of behavioral features and any one or more of the additional sets of behavioral features exceeding a threshold.

16. The method of claim 1, wherein the PIP and the PIPs originate from web pages having a similar number of widgets of each type.

17. An apparatus having a processor, the processor being adapted to perform the steps of:
  obtaining a set of behavioral features based on a PIP of a usage of an input device during an interaction of an agent with a web page, wherein the set of behavioral features are consistent with a human-generated interaction, wherein the set of behavioral features are generated based on events obtained from a client device used by the agent;
  automatically estimating whether the agent is a bot based on:
    comparison of the set of behavioral features with one or more additional sets of behavioral features based on PIPs, wherein the one or more additional sets of behavioral features were previously obtained based on interactions of one or more agents with one or more web pages, and wherein the PIPs originate only from web pages of a same type as the PIP; and
    subject to the behavioral features representing a human generated interaction, determining that the set of behavioral features is associated with replayed human interactions rather than original human interactions, wherein replayed human interactions are interactions in which a recorded set of interactions originally performed by a human are injected by the bot, thereby mimicking human behavior; and
  in response to an estimation that the agent is a bot, performing a responsive action.

18. The apparatus of claim 17, wherein said processor is further adapted to perform:
  verifying that the set of behavioral features are consistent with a human-generated interaction;
  wherein in response to said verifying, performing said automatically estimating.

19. The apparatus of claim 17, wherein said comparison is performed by a first classifier, wherein the first classifier obtains multidimensional vectors each of which is defined by a set of behavioral features, wherein said first classifier is configured to provide a classification of a bot for a set of behavioral features based on a statistical measurement being above or below a threshold.

20. The apparatus of claim 17, wherein the PIP and the PIPs are obtained from a same session.

21. The apparatus of claim 17, wherein the PIP is obtained from a first session, wherein the PIPs comprise at least a subset of PIPs that are obtained from a second session.

22. The apparatus of claim 17, wherein the web pages are from different websites, wherein the different websites are websites of a similar subject matter.

23. The apparatus of claim 17, wherein the set of behavioral features is based on a Session Interaction Packet (SIP), wherein the one or more additional sets of behavioral features are based on SIPs.

24. The apparatus of claim 17, wherein the apparatus is a server connectable to computerized devices over a communication network, wherein said obtaining comprises receiving, by the server, the set of behavioral features or indications thereof from a client-side script embedded in the web page that is being executed by a computerized device of the agent while the agent is interacting with the web page.

25. The apparatus of claim 17, wherein determining whether the behavioral features are generated by original human interactions or replayed human interactions is performed by a second classifier.

26. The apparatus of claim 17, wherein the PIP and PIPs exclude VIPs.

27. The apparatus of claim 17, wherein said determining that the set of behavioral features is associated with replayed human interactions rather than original human interactions, is based on a similarity degree between the set of behavioral features and any one or more of the additional sets of behavioral features exceeding a threshold.

28. The apparatus of claim 17, wherein the PIP and the PIPs originate from web pages having a similar number of widgets of each type.

29. A computer program product comprising a non-transitory computer readable storage medium retaining program instructions, which program instructions when read by a processor, cause the processor to perform a method comprising:
  obtaining a set of behavioral features based on a PIP of a usage of an input device during an interaction of an agent with a web page, wherein the set of behavioral features are consistent with a human-generated interaction, wherein the set of behavioral features are generated based on events obtained from a client device used by the agent;
  automatically estimating whether the agent is a bot based on:
    comparison of the set of behavioral features with one or more additional sets of behavioral features based on PIPs, wherein the one or more additional sets of behavioral features were previously obtained based on interactions of one or more agents with one or more web pages, and wherein and the PIPs originate only from web pages of a same type as the PIP; and
    subject to the behavioral features representing a human generated interaction, determining that the set of behavioral features is associated with replayed human interactions rather than original human interactions, wherein replayed human interactions are interactions in which a recorded set of interactions originally performed by a human are injected by the bot, thereby mimicking human behavior; and
  in response to an estimation that the agent is a bot, performing a responsive action.

* * * * *